(12) United States Patent
Shimizu

(10) Patent No.: US 11,457,122 B2
(45) Date of Patent: Sep. 27, 2022

(54) PASSWORD AUTHENTICATION DEVICE, IMAGE PROCESSING APPARATUS, AND PASSWORD AUTHENTICATION METHOD

(71) Applicant: KYOCERA Document Solutions Inc., Osaka (JP)

(72) Inventor: Takeo Shimizu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/175,835

(22) Filed: Feb. 15, 2021

(65) Prior Publication Data
US 2021/0266424 A1 Aug. 26, 2021

(30) Foreign Application Priority Data
Feb. 21, 2020 (JP) .............................. JP2020-027883

(51) Int. Cl.
H04N 1/44 (2006.01)
G06F 21/45 (2013.01)
G06F 21/31 (2013.01)

(52) U.S. Cl.
CPC ........... H04N 1/4413 (2013.01); G06F 21/31 (2013.01); G06F 21/45 (2013.01); *H04N 2201/0081* (2013.01); *H04N 2201/0094* (2013.01)

(58) Field of Classification Search
CPC .......... G06F 21/32; G06F 21/31; G06F 21/45; G06K 9/00087; G06K 9/00288; G06K 9/00885; G06K 9/00926; G06K 9/685; G06T 2207/10004; G06T 2207/30196; G06T 7/0012; H04L 63/0861; H04L 9/3231; H04N 1/4413; H04N 2201/0081; H04N 2201/0094

USPC ....................................................... 358/1.15
See application file for complete search history.

(56) References Cited

U.S. PATENT DOCUMENTS

| | | | | |
|---|---|---|---|---|
| 7,161,468 | B2 * | 1/2007 | Hwang | H04L 63/0861 340/5.82 |
| 9,777,623 | B2 * | 10/2017 | Nishio | F02D 9/04 |
| 10,223,517 | B2 * | 3/2019 | Kandekar | G06F 21/36 |
| 11,317,006 | B2 * | 4/2022 | Deguchi | H04N 1/4426 |
| 2004/0164848 | A1 * | 8/2004 | Hwang | G06F 21/32 340/5.82 |
| 2009/0245596 | A1 * | 10/2009 | Niinuma | G06K 9/00107 382/124 |
| 2011/0075577 | A1 * | 3/2011 | Chen | H04L 43/50 370/252 |
| 2012/0013436 | A1 * | 1/2012 | Niinuma | G06K 9/00087 340/5.82 |
| 2013/0254875 | A1 * | 9/2013 | Sama | G06F 21/31 726/19 |

(Continued)

FOREIGN PATENT DOCUMENTS

JP 2005-149388 6/2005

*Primary Examiner* — Negussie Worku
(74) *Attorney, Agent, or Firm* — Lex IP Meister, PLLC

(57) ABSTRACT

A password authentication device includes an authentication processing unit and an output processing unit. The authentication processing unit authenticates a user when an input password that is input matches a predetermined first password. The output processing unit outputs a hint of the first password when a matching rate between a predetermined second password different from the first password and the input password is equal to or greater than a predetermined first threshold value.

10 Claims, 6 Drawing Sheets

(56) References Cited

U.S. PATENT DOCUMENTS

| | | | | |
|---|---|---|---|---|
| 2014/0165171 A1* | 6/2014 | Meng | ............... | G06F 21/31 |
| | | | | 726/7 |
| 2016/0149895 A1* | 5/2016 | Takai | ............... | G06F 21/608 |
| | | | | 726/7 |
| 2019/0236262 A1* | 8/2019 | Yamada | ............... | G06F 21/36 |
| 2021/0266424 A1* | 8/2021 | Shimizu | ............... | H04N 1/4413 |
| 2021/0289104 A1* | 9/2021 | Deguchi | ............... | H04N 1/00973 |

\* cited by examiner

FIG. 2

| AUTHENTICATION ID | SETTING PASSWORD |
|---|---|
| aaaa | 11111111 |
| bbbb | 22222222 |
| cccc | 33333333 |

| AUTHENTICATION ID / aaaa | FIRST STORAGE PASSWORD |
|---|---|
| 2020/1/20 18:01 | xxxxxxxx |
| 2020/1/30 10:52 | yyyyyyyy |
| 2020/1/30 10:53 | zzzzzzzz |

| USER ID / aaaa | SECOND STORAGE PASSWORD |
|---|---|
| 2020/1/10 08:32 | 00000000 |
| 2020/1/15 07:45 | 99999999 |
| 2020/1/25 12:14 | 88888888 |

61

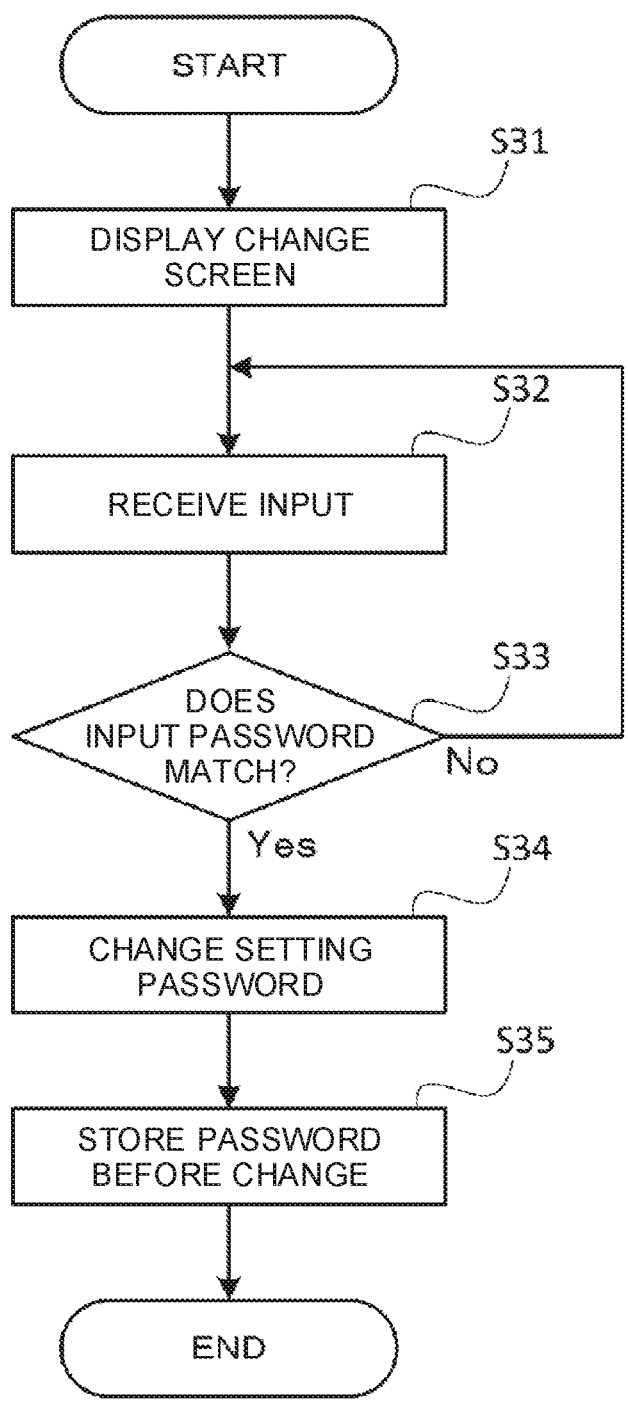

PASSWORD AUTHENTICATION DEVICE, IMAGE PROCESSING APPARATUS, AND PASSWORD AUTHENTICATION METHOD

INCORPORATION BY REFERENCE

This application is based upon and claims the benefit of priority from the corresponding Japanese Patent Application No. 2020-027883 filed on Feb. 21, 2020, the entire contents of which are incorporated herein by reference.

BACKGROUND

The present disclosure relates to a password authentication device, an image processing apparatus, and a password authentication method.

A password authentication device that authenticates a user when an input password matches a registered password that has been registered in advance is known. A password authentication device that can assist a user who has failed to input a registered password to input the next password is known as a related art. In this password authentication device, when the input password does not match the registered password and the similarity ratio between the input password and the registered password exceeds a predetermined threshold value, support information for assisting the user to input the next password is presented.

For example, when a user selectively uses a plurality of passwords in accordance with the use, a password different from the registered password may be selected from the plurality of passwords and input to the password authentication device by mistake of the user. In this case, the input password and the registration password may not be similar, and the related art may not be able to assist the user in selecting the correct password.

SUMMARY

A password authentication device according to this disclosure includes an authentication processing unit and an output processing unit. The authentication processing unit authenticates a user when an input password that is input matches a predetermined first password. The output processing unit outputs a hint of the first password when a matching rate between a predetermined second password different from the first password and the input password is equal to or greater than a predetermined first threshold value.

An image processing apparatus according to this disclosure includes the password authentication apparatus, and one or both of an image reading unit and an image forming unit. The image reading unit reads image data from a document. The image forming unit forms an image based on the image data.

An image forming method according to this disclosure is an image forming method using an image forming apparatus that is connectable to a network, and includes an operation display process of using a predetermined menu configuration, a storing process of storing model type information indicating a function executable by the image forming apparatus, and a control process of controlling the operation display process. The control process searches for model type information to at least one other information forming apparatus connected to the network, identifies a substitutable function that is a function not executable by the image forming apparatus but executable by the at least one other image forming apparatus, and returns information indicating the function executable by the information forming apparatus based on the model type information, in accordance with the search of the model type information from another information forming apparatus, where the predetermined menu configuration includes a menu configuration that is consistent with a menu configuration in the operation display process of the other image forming apparatus, and enables execution of the substitutable function which has been identified, by the at least one other image forming apparatus.

A password authentication method according to this disclosure includes: authenticating a user when an input password that is input matches a predetermined first password; and outputting a hint of the first password when a matching rate between a predetermined second password different from the first password and the input password is equal to or greater than a predetermined first threshold value.

BRIEF DESCRIPTION OF THE DRAWINGS

FIG. 2 is a diagram illustrating an example of user authentication information stored in a storage unit of the image processing apparatus according to the embodiment of the present disclosure.

FIG. 3 is a diagram illustrating an example of input history information stored in a storage unit of the image processing apparatus according to the embodiment of the present disclosure.

FIG. 4 is a diagram illustrating an example of change history information stored in a storage unit of the image processing apparatus according to the embodiment of the present disclosure.

FIG. 9 is a flowchart illustrating an example of a procedure of password change processing executed by the image processing apparatus according to the embodiment of the present disclosure.

DETAILED DESCRIPTION

Hereinafter, embodiments of the present disclosure will be described with reference to the accompanying drawings, and will be provided for understanding of the present disclosure.

[Configuration of Image Processing Apparatus 1]

Figure 1:
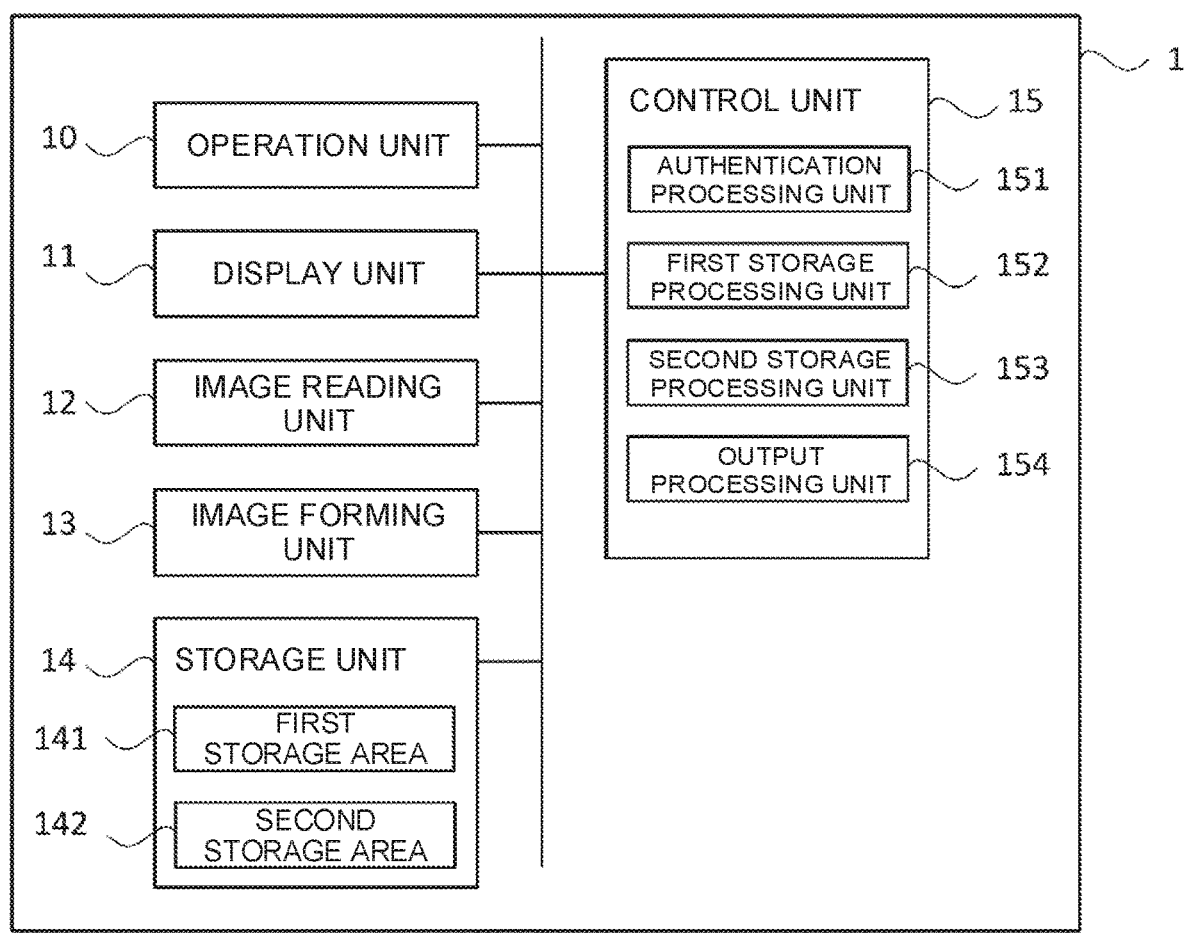
FIG. 1 is a block diagram illustrating a configuration of an image processing apparatus according to an embodiment of the present disclosure.

As shown in FIG. 1, the image processing apparatus 1 according to the embodiment includes an operation unit 10, a display unit 11, an image reading unit 12, an image forming unit 13, a storage unit 14, and a control unit 15. For example, the image processing apparatus 1 is a multifunction peripheral having a plurality of functions such as a printing function and a copying function. The image processing apparatus 1 may be a printer, a scanner, a copying machine, or a fax machine.

The operation unit 10 includes an operation key or a touch panel for inputting an instruction such as a print request or various information in response to a user operation.

The display unit 11 is a display unit such as a liquid crystal display for displaying information.

The image reading unit 12 includes a document table, a light source, a mirror, an optical lens, and a charge coupled device (CCD), and can read an image of a document and output it as image data.

The image forming unit 13 is capable of executing a printing process based on image data by an electro-photographic method or an ink jet method, and forms an image on a sheet based on the image data. For example, when the image forming unit 13 is an image forming unit of an electro-photographic type, the image forming unit 13 includes a photosensitive drum, a charger, an exposure device, a developing device, a transfer device, a fixing device, and the like.

The storage unit 14 is a nonvolatile storage device. For example, the storage unit 14 is a storage device such as a nonvolatile memory, such as a flash memory or EEPROM (registered trademark), an SSD (solid state drive), or an HDD (hard disk drive). The storage unit 14 stores user authentication information 41 shown in FIG. 2 (information shown in a region surrounded by a dot-and-dash line in FIG. 2), input history information 51 shown in FIG. 3 (information shown in a region surrounded by a dot-and-dash line in FIG. 3), and change history information 61 shown in FIG. 4 (information shown in a region surrounded by a dot-and-dash line in FIG. 4).

The user authentication information 41 is information used to authenticate a user of the image processing apparatus 1. As shown in FIG. 2, the user authentication information 41 includes a predetermined authentication ID and a predetermined setting password corresponding to each of the plurality of users. The authentication ID is identification information used to identify the user. The setting password is used to authenticate the user identified by the authentication ID. Details of the input history information 51 and the change history information 61 will be described later.

The control unit 15 includes control devices such as a CPU, a ROM, and a RAM. The CPU is a processor that executes various kinds of arithmetic processing. The ROM is nonvolatile storage in which information such as a control program for causing the CPU to execute various kinds of processing is stored in advance. The RAM is volatile or nonvolatile storage used as a temporary storage memory (work area) for various kinds of processing executed by the CPU.

The control unit 15 includes an authentication processing unit 151, a first storage processing unit 152, a second storage processing unit 153, and an output processing unit 154 shown in FIG. 1. Specifically, the control unit 15 functions as an authentication processing unit 151, a first storage processing unit 152, a second storage processing unit 153, and an output processing unit 154 by executing processing according to the control program. The control unit 15 may include an electronic circuit that implements the processing functions of the authentication processing unit 151, the first storage processing unit 152, the second storage processing unit 153, and the output processing unit 154. The apparatus including the control unit 15 is an example of the password authentication apparatus according to the present disclosure.

The authentication processing unit 151 performs authentication processing for authenticating the user based on the input password input by the user, and the authentication processing unit 151 performs processing for receiving the input password.

Figure 5:
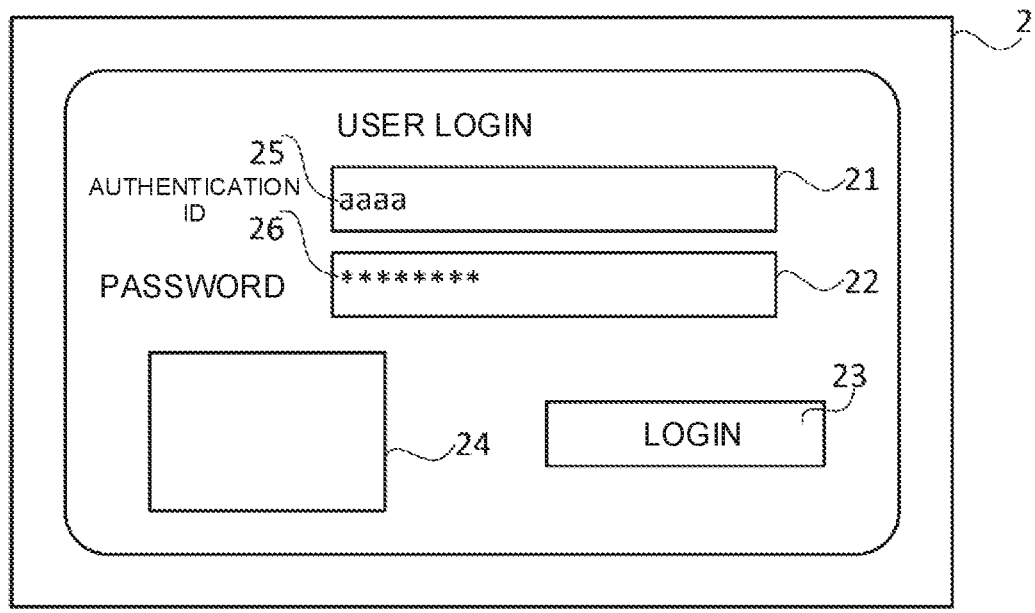
FIG. 5 is a diagram illustrating an example of a password input screen used in the image processing apparatus according to the embodiment of the present disclosure.

Specifically, the authentication processing unit 151 causes the display unit 11 to display the password input screen 2 shown in FIG. 5 as necessary.

As shown in FIG. 5, the password input screen 2 includes an input field 21 and an input field 22. The input field 21 is used to input the authentication ID. For example, the authentication ID 25 shown in FIG. 5 is input to the input field 21. The input field 22 is used to input the input password. For example, the input password 26 is input to the input field 22. In the input field 22, the character input by the user is displayed by being replaced with a predetermined symbol such as "*". The password input screen 2 includes an operation button 23 used for accepting input contents. The password input screen 2 includes a hint output window 24. The hint output window 24 will be described later.

For example, when the operation button 23 is operated on the password input screen 2 shown in FIG. 5, the authentication processing unit 151 receives the authentication ID 25 input to the input field 21 and the input password 26 input to the input field 22, and the authentication processing unit 151 executes the authentication processing based on the received authentication ID 25 and the input password 26.

Specifically, the authentication processing unit 151 acquires the setting password corresponding to the same authentication ID as the received authentication ID 25 from the user authentication information 41 stored in the storage unit 14, and the authentication processing unit 151 determines whether the received input password 26 matches the acquired setting password.

When the authentication processing unit 151 determines that the input password 26 and the setting password match, the authentication processing unit 151 authenticates (logs in) the user. For example, the authentication processing unit 151 causes the display unit 11 to display a screen (not shown) after login, such as an initial operation screen corresponding to the authenticated user. On the other hand, when the authentication processing unit 151 determines that the input password 26 and the setting password do not match, the authentication processing unit 151 does not authenticate the user.

When a logout operation is performed on the operation unit 10 after the user is logged in, when a predetermined time has elapsed, or when another user is to be logged in, the authentication processing unit 151 executes a logout process to cause the currently logged-in user to log out.

A password authentication device capable of supporting input of a next password by the user who has failed in input of the setting password is known as a related art. In this password authentication device, support information for supporting input of a next password by the user is presented when the input password and the setting password do not match and the similarity ratio between the input password and the setting password exceeds a predetermined threshold value.

Here, for example, in the case where the user uses a plurality of passwords in accordance with the use, a password different from the setting password may be selected from the plurality of passwords and input to the image processing apparatus 1 due to the user's misunderstanding. In this case, the input password and the setting password may not be similar to each other, and the related art may not be able to support the user's selection of a correct password.

On the other hand, according to the image processing apparatus 1 of this embodiment, it is possible to support the user to input a correct password who has input a different password by misunderstanding.

The output processing unit 154 outputs a hint of the setting password when the input password matches a predetermined storage password different from the setting password.

The storage password is a password dissimilar to the setting password. Specifically, the storage password is a password whose rate of coincidence with the setting password is less than a predetermined second threshold value. The second threshold value is a value used for determining whether or not the setting password and the storage password are in a non-similar relationship. The second threshold value may be a value that is determined in advance to be unchangeable, or may be a value that is arbitrarily determined in accordance with a user's operation in the operation unit 10.

The storage password is a password stored in the storage unit 14 by a first storage processing unit 152 and a second storage processing unit 153 which will be described later. The storage password may be a password set in accordance with a predetermined setting operation in the operation unit 10.

The hint is information suggesting the contents of the setting password.

Figure 6:
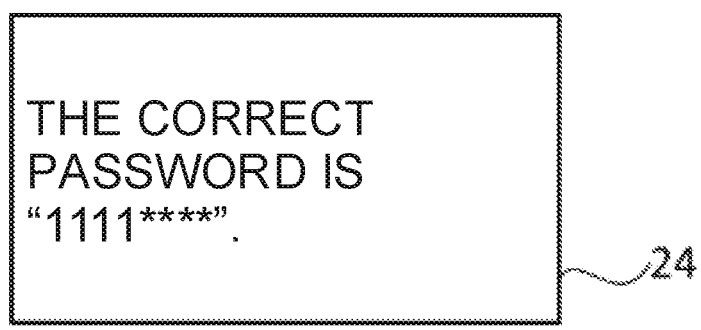
FIG. 6 is a diagram illustrating an example of a hint displayed by the image processing apparatus according to the embodiment of the present disclosure.

For example, the output processing unit 154 causes the hint output window 24 of the password input screen 2 to display the hint. For example, as shown in FIG. 6, the hint includes information disclosing a part of a character string constituting the setting password.

The hint may include a message indicating a possibility that the user entered another password by misunderstanding. The hint may include information disclosing the number of characters in the character string constituting the setting password. The hint may include information disclosing some characters in the character string constituting the setting password. The hint may be output by voice or may be printed.

When the user is authenticated by the authentication processing unit 151, the first storage processing unit 152 causes all of the input passwords during the password input reception period until the user is authenticated, having a rate of coincidence (matching rate) with the setting password that is less than the second threshold value, to be stored in a predetermined first storage area 141 of the storage unit 14 as first saved passwords.

For example, the first storage processing unit 152 stores the first storage password in the first storage area 141 of the storage unit 14 in association with the authentication ID of the user who has input the first storage password and the input date and time of the first storage password. The password input reception period is a period from the display start to the display end of the password input screen 2 displayed on the display unit 11 immediately before the user is authenticated.

FIG. 3 shows input history information 51 composed of a plurality of the first storage passwords stored in the first storage area 141 of the storage unit 14 by the first storage processing unit 152. The input history information 51 is associated with the authentication ID and includes a plurality of sets of the first storage passwords and the input date and time of the first storage password.

The first storage processing unit 152 may store, in the first storage area 141, part of the input password during the password input reception period, which is less than the second threshold value in terms of the rate of coincidence with the setting password, as the first storage password. For example, the first storage processing unit 152 may cause the first storage area 141 to store, as the first storage password, only the input password that has a matching rate with the setting password that is less than the second threshold value and that is input first among the input passwords during the password input reception period.

When the setting password is changed and the matching rate between the passwords before and after the change is less than the second threshold value, the second storage processing unit 153 stores the password used as the setting password until the change as a second storage password in a predetermined second storage area 142 of the storage unit 14.

Figure 7:
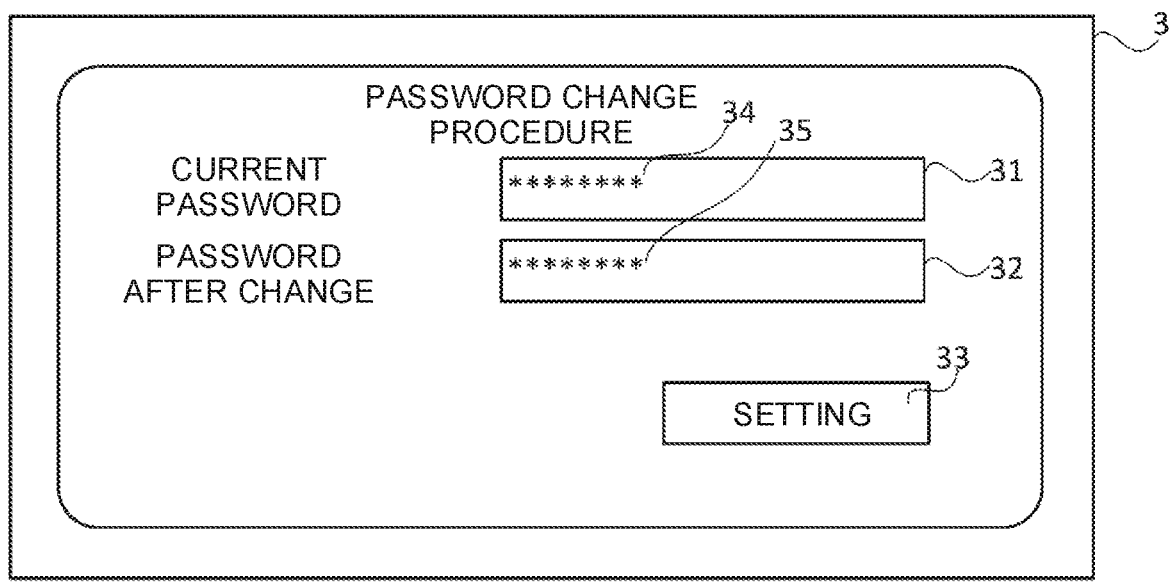
FIG. 7 is a diagram illustrating an example of a password change screen used in the image processing apparatus according to the embodiment of the present disclosure.

For example, the second storage processing unit 153 causes the display unit 11 to display the password change screen 3 shown in FIG. 7 as necessary while the user is logged in.

As shown in FIG. 7, the password change screen 3 includes an input field 31 and an input field 32. The input field 31 is used to input the current setting password. For example, the password 34 shown in FIG. 7 is input to the input field 31. The input field 32 is used to input the changed setting password. For example, the password 35 shown in FIG. 7 is input to the input field 32. In the input field 31 and the input field 32, characters input by the user are displayed by being replaced with predetermined symbols such as "*". The password change screen 3 includes an operation button 33 used for receiving input contents.

For example, when the operation button 33 is operated on the password change screen 3 shown in FIG. 7, the second storage processing unit 153 compares the password 34 input in the input field 31 with the setting password corresponding to the logged-in user. When the password 34 and the setting password match, the second storage processing unit 153 causes the storage unit 14 to store the password 35 input in the input field 32 as the new setting password corresponding to the logged-in user, instead of the setting password before the change. The second storage processing unit 153 causes the storage unit 14 to store the setting password before the change as the second storage password in the second storage area 142.

Here, FIG. 4 shows change history information 61 composed of a plurality of the second storage passwords stored in the second storage area 142 of the storage unit 14 by the second storage processing unit 153. The change history information 61 is associated with the authentication ID and includes a plurality of sets of the second storage passwords and a date and time when the second storage password became no longer the setting password.

The control unit 15 may not include either or both of the first storage processing unit 152 and the second storage processing unit 153.

[Authentication Control Processing]

Figure 8:
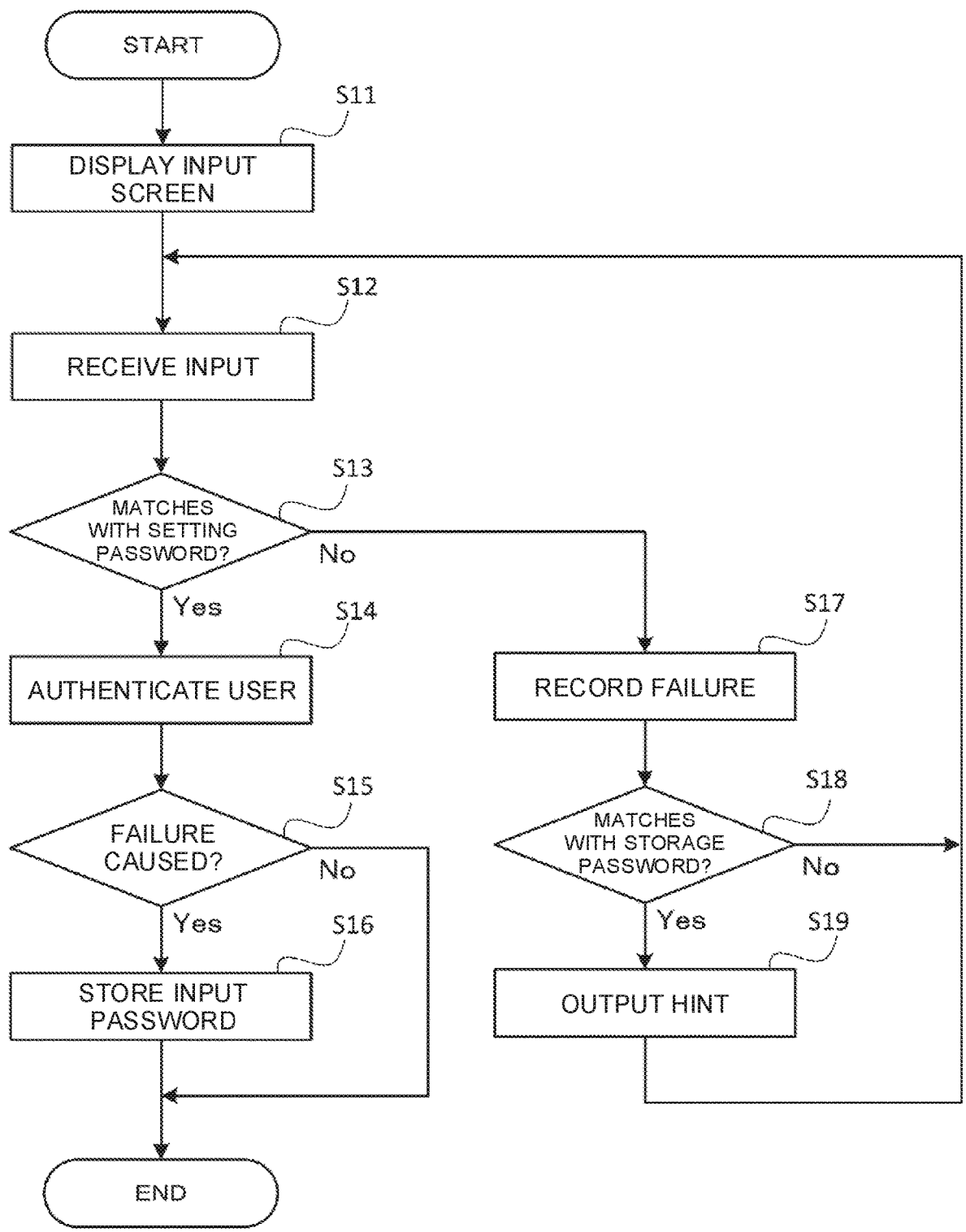
FIG. 8 is a flowchart illustrating an example of a procedure of an authentication control process executed by the image processing apparatus according to the embodiment of the present disclosure.

Referring now to FIG. 8, an example of the authentication control process executed by the control unit 15 of the image processing apparatus 1 will be described. Here, steps S11, S12, represent the number of the processing procedure (step) executed by the control unit 15. The authentication control process is started when the display instruction of the password input screen 2 is input.

<Step S11>

First, in step S11, the control unit 15 causes the display unit 11 to display the password input screen 2 shown in FIG. 5. The process of step S11 is executed by the authentication processing unit 151 of the control unit 15.

<Step S12>

In step S12, the control unit 15 receives the authentication ID input to the input field 21 and the input password input to the input field 22 in response to an operation on the operation button 23 of the password input screen 2. The processing in step S12 is executed by the authentication processing unit 151 of the control unit 15.

<Step S13>

In step S13, the control unit 15 determines whether or not the input password received in step S12 matches the setting password corresponding to the authentication ID received in step S12. If both are matched (S13: Yes), the process proceeds to step S14. If both are not matched (S13: No), the process proceeds to step S17.

<Step S17>

In step S17, the control unit 15 records the authentication failure of the user in the RAM of the control unit 15.

<Step S14>

On the other hand, in step S14, the control unit 15 authenticates (logs in) the user corresponding to the authentication ID received in step S12. For example, the control unit 15 causes the display unit 11 to display the initial setting screen corresponding to the authenticated user. The processing in step S14 is executed by the authentication processing unit 151 of the control unit 15.

<Step S15>

In step S15, the control unit 15 determines whether or not the authentication of the user has failed during the execution of the authentication control process. Specifically, the control unit 15 determines that the authentication of the user has failed when the authentication failure of the user has been recorded in the RAM. When it is determined that the authentication of the user has failed (S15: Yes), the process proceeds to step S16. When it is determined that the authentication of the user has not failed (S15: No), the authentication control process ends.

<Step S16>

On the other hand, in step S16, the control unit 15 causes the storage unit 14 to store, in the first storage area 141, as the first storage password, a password of the input password received in step S12 whose rate of coincidence (matching rate) with the setting password is less than the second threshold value. For example, the control unit 15 causes the first storage password to be stored in the first storage area 141 of the storage unit 14 in association with the authentication ID of the user who has input the first storage password and the input date and time of the first storage password. The processing in step S16 is executed by the first storage processing unit 152 of the control unit 15.

Thus, when the user authenticated in step S14 inputs another password different from the setting password corresponding to the user by misunderstanding, the other password is stored in the first storage area 141 of the storage unit 14 as the first storage password. Therefore, in another authentication control process executed after completion of the authentication control process, the hint can be output based on the first storage password stored in the first storage area 141 of the storage unit 14.

<Step S18>

In step S18, the control unit 15 determines whether or not the input password received in step S12 matches the storage password (the first storage password or the second storage password) corresponding to the authentication ID received in step S12. If both are matched (S18: Yes), the process proceeds to step S19. If both are not matched (S18: No), the process proceeds to step S12.

<Step S19>

In step S19, the control unit 15 outputs the hint to the hint output window 24 of the password input screen 2. Then, the process returns to step S12. The process in step S19 is executed by the output processing unit 154 of the control unit 15.

Password Change Processing

Referring to FIG. 9, an example of the procedure of the password change processing executed by the control unit 15 of the image processing apparatus 1 will be described. The password change processing is started when an instruction to display the password change screen 3 is input while the user is logged in.

<Step S31>

First, in step S31, the control unit 15 causes the display unit 11 to display the password change screen 3. The processing in step S31 is executed by the second storage processing unit 153 of the control unit 15.

<Step S32>

In step S32, the control unit 15 receives the input password input in the input field 31 and the input password input in the input field 32 in response to an operation on the operation button 33 of the password change screen 3. The processing in step S32 is executed by the second storage processing unit 153 of the control unit 15.

<Step S33>

In step S33, the control unit 15 determines whether or not the input password input to the input field 31 received in step S32 matches the setting password corresponding to the user who is currently logged in. If both passwords match (S33: Yes), the process proceeds to step S34. If both passwords do not match (S33: No), the process proceeds to step S32.

<Step S34>

In step S34, the control unit 15 changes the setting password corresponding to the logged-in user based on the input password input to the input field 32 received in step S32. The processing in step S34 is executed by the second storage processing unit 153 of the control unit 15.

<Step S35>

In step S35, the control unit 15 causes the setting password before the change to be stored as the second storage password in the second storage area 142 of the storage unit 14. Then, the password change processing ends. The processing in step S35 is executed by the second storage processing unit 153 of the control unit 15.

Thus, in the authentication control process executed after completion of the password change process, the hint can be output based on the second storage password stored in the second storage area 142 of the storage unit 14.

The process of step S34 may be executed after the process of step S35.

As described above, in the image processing apparatus 1 according to this embodiment, when the storage password different from the setting password and the input password coincide with each other, the hint is output. Therefore, according to the image processing apparatus 1 according to the present embodiment, it is possible to support the input of a correct password by the user who inputs another password by misunderstanding, specifically, the first storage password or the second storage password.

The output processing unit 154 may output the hint of the setting password when the rate of coincidence between the storage password and the input password is equal to or greater than a predetermined first threshold value. This makes it possible to output the hint even when an input error is made while trying to input the storage password by misunderstanding.

Here, the first threshold value is a preset value, for example, 0.9 (90 percent). The first threshold value may be a value calculated based on the number of characters of the storage password for checking. For example, the first threshold value may be a value obtained by dividing a value (a dividend value) obtained by subtracting 1 from the number of characters of the storage password for checking, by the number of characters of the storage password (a division value).

The first threshold value may be a value arbitrarily set according to a user's operation in the operation unit 10. The first threshold value may be the same value as the second threshold value.

When the output processing unit 154 outputs the hint based on the rate of coincidence between the input password and the storage password, the first storage processing unit 152 may exclude, from among the input passwords during the password input reception period, a password whose rate of coincidence with the storage password is equal to or greater than the first threshold value, from a target of storage in the first storage area 141 of the storage unit 14. Thereby, it is possible to reduce the number of the storage passwords stored in the storage unit 14 without making the output condition of the recording hint strict.

In addition, the output processing unit 154 may output the hint when the rate of coincidence between the input password and the setting password is equal to or greater than the second threshold value. Thus, the hint can also be output when the user makes an input error while trying to input the setting password. In this case, the hint may include a message indicating that the user has failed to input the setting password due to an input error.

What is claimed is:

1. A password authentication device having a hardware processor executing computer instructions, the computer instructions comprising:
   an authentication processing unit that determines whether an input password that is input by a user matches a setting password of the user, stored in a storage unit, and authenticates the user in accordance with the determination;
   a first storage processing unit that stores, as a first password in the storage unit in association with the user, the input password which has a matching rate with the setting password, which matching rate is less than a second threshold value, among input passwords input by the user during an authentication processing by the authentication processing unit; and
   an output processing unit that outputs a hint of the setting password to the user when the authentication processing unit determines that the input password does not match the setting password and the input password matches the first password stored in the storage unit.

2. The password authentication device according to claim 1, wherein the first storage processing unit stores the input password as the first password in the storage unit when the authentication processing unit determines that the input password matches the setting password and authenticates the user.

3. The password authentication device according to claim 2, wherein the first storage processing unit excludes a password having a matching rate with a second password equal to or higher than a first threshold value among the input passwords input during the authentication processing, from a target of storage in the first storage unit.

4. The password authentication device according to claim 1, wherein the computer instructions further comprise a second storage processing unit that changes the setting password of the user, stored in the storage unit, to the input password input by the user, the second storage unit determining whether a matching rate of the setting password and the input password, and storing, when the matching rate is less than the second threshold value, the setting password as a second password in the storage unit.

5. The password authentication device according to claim 4, wherein the output processing unit outputs the hint when the authentication processing unit determines that the input password does not match the setting password and the input password matches the first password or the second password, stored in the storage unit.

6. The password authentication device according to claim 4, wherein the first storage processing unit stores the first password in a first storage are of the storage unit, the second storage processing unit stores the second password in a second storage are of the storage unit.

7. An image processing apparatus comprising:
   the password authentication apparatus according to claim 1; and
   one or both of an image reading unit that reads image data from a document and an image forming unit that forms an image based on the image data.

8. A password authentication method comprising:
   determining whether an input password that is input by a user matches a setting password of the user, stored in a storage unit, and authenticating the user in accordance with the determination;
   storing, as a first password in the storage unit in association with the user, the input password which has a matching rate with the setting password, which matching rate is less than a second threshold value, among input passwords input by the user during an authentication processing; and
   outputting a hint of the setting password when the determining and authenticating determines that the input password does not match the setting password and the input password matches the first password stored in the storage unit.

9. The password authentication device according to claim 1, wherein the hint includes information suggesting contents of the setting password, the information including at least one of the number of characters in the character string constituting the setting password, a part of a character string constituting the setting password, and a message indicating a possibility that the user enters the input password by misunderstanding.

10. The password authentication device according to claim 1, wherein the output processing unit outputs the hint by voice or printing.

* * * * *